(12) United States Patent
    Staten

(10) Patent No.: US 11,744,353 B1
(45) Date of Patent: Sep. 5, 2023

(54) GRIP FOR A HANDHELD DEVICE

(71) Applicant: Fourstar Group Inc., Taipei (TW)

(72) Inventor: Durward Leon Staten, Largo, FL (US)

(73) Assignee: Fourstar Group Inc., Taipei (TW)

( * ) Notice: Subject to any disclaimer, the term of this patent is extended or adjusted under 35 U.S.C. 154(b) by 337 days.

(21) Appl. No.: 17/110,461

(22) Filed: Dec. 3, 2020

(51) Int. Cl.
   *A45F 5/10* (2006.01)
   *H04M 1/04* (2006.01)

(52) U.S. Cl.
   CPC .............. *A45F 5/10* (2013.01); *H04M 1/04* (2013.01); *A45F 2200/0516* (2013.01); *A45F 2200/0525* (2013.01)

(58) Field of Classification Search
   CPC .............. A45F 5/10; A45F 2200/0516; A45F 2200/0525; H04M 1/04; F16M 11/38
   See application file for complete search history.

(56) References Cited

U.S. PATENT DOCUMENTS

| | | | |
|---|---|---|---|
| D689,479 S | 9/2013 | Soffer | |
| 8,560,031 B2 | 10/2013 | Barnett et al. | |
| D735,695 S | 8/2015 | Murphy | |
| 9,259,077 B2 | 2/2016 | Murphy et al. | |
| 9,367,090 B2 | 6/2016 | Barnett et al. | |
| 9,421,920 B2 | 8/2016 | Jang | |
| D777,022 S | 1/2017 | Barnett | |
| D794,607 S | 8/2017 | Srour | |
| 9,787,348 B2 | 10/2017 | Srour | |
| 9,804,636 B2 | 10/2017 | Barnett et al. | |
| 9,954,569 B2 | 4/2018 | Murphy et al. | |
| D818,808 S | 5/2018 | Barnett | |
| 9,958,107 B1 | 5/2018 | Hobbs et al. | |
| 9,970,589 B2 | 5/2018 | Hobbs et al. | |
| 10,019,034 B2 | 7/2018 | Barnett et al. | |
| 10,030,807 B1 | 7/2018 | Hobbs et al. | |
| 10,054,259 B2 | 8/2018 | Hobbs et al. | |
| 10,060,573 B2 | 8/2018 | Hobbs et al. | |
| D835,091 S | 12/2018 | Torrance | |
| 10,200,518 B2 * | 2/2019 | Richter | A45F 5/00 |
| 10,215,329 B2 | 2/2019 | Hobbs et al. | |
| 10,317,005 B2 | 6/2019 | Hobbs et al. | |
| 10,348,352 B2 | 7/2019 | Barnett et al. | |
| 10,386,009 B2 | 8/2019 | Hobbs et al. | |
| 10,389,860 B2 | 8/2019 | Nahum et al. | |
| D862,453 S | 10/2019 | Liang | |
| 10,463,116 B2 | 11/2019 | Barnett et al. | |

(Continued)

OTHER PUBLICATIONS

English translation of WO 2019/103338 A1 (Year: 2019).*

*Primary Examiner* — Dean J Kramer
(74) *Attorney, Agent, or Firm* — Salter & Michaelson

(57) ABSTRACT

An expandable grip apparatus to assist in holding a handheld device includes a base member having a substantially flat contact surface for securing to a surface of the handheld device, a top member that is spaced from the base member, and an expandable center section that connects between the base member and the top member, the expandable center section comprised of a series of integral foldable pleats. The series of integral foldable pleats include adjacently disposed foldable pleats that define a living hinge between the adjacently disposed foldable pleats to enable the expandable center section to selectively nest onto each other. The base member can include an adhesive or a magnet for securing the grip apparatus to the handheld device.

18 Claims, 12 Drawing Sheets

(56) References Cited

U.S. PATENT DOCUMENTS

| | | | |
|---|---|---|---|
| 10,463,126 B2 | 11/2019 | Mallory et al. | |
| 10,571,964 B2 | 2/2020 | Barnett et al. | |
| D878,352 S | 3/2020 | Yang | |
| 10,638,627 B1* | 4/2020 | Stime | F16M 11/10 |
| D883,273 S | 5/2020 | Chen | |
| 10,655,775 B2 | 5/2020 | Hobbs et al. | |
| 10,686,481 B2 | 6/2020 | Barnett et al. | |
| 10,721,343 B2 | 7/2020 | Nahum et al. | |
| 10,735,572 B2 | 8/2020 | Nahum et al. | |
| 10,742,251 B2 | 8/2020 | Barnett et al. | |
| 2013/0279098 A1 | 10/2013 | Cho | |
| 2018/0348541 A1* | 12/2018 | Radzwill | A45C 11/04 |
| 2019/0225378 A1* | 7/2019 | Barnett | A47G 23/0216 |
| 2019/0281964 A1 | 9/2019 | Britt et al. | |
| 2020/0217449 A1* | 7/2020 | Barnett | H04M 1/21 |
| 2020/0267249 A1* | 8/2020 | Shaw | F16M 11/041 |
| 2020/0326030 A1* | 10/2020 | Surani | F16M 11/38 |

\* cited by examiner

GRIP FOR A HANDHELD DEVICE

FIELD OF THE INVENTION

The present invention relates in general to a grip used to assist in holding a handheld device such as a phone or a tablet, or another object.

BACKGROUND OF THE INVENTION

It can oftentimes be difficult to hold a phone or other handheld device while also utilizing the device, due to all (or nearly all) of your fingers being needed to securely hold the phone within a user's hand. This disadvantageously only allows a user to have one free hand as the other hand assists with holding the phone, or other handheld device such as a tablet, or the like. Accordingly, it is an object of the present invention to provide a grip to assist in holding a phone or other handheld device.

SUMMARY OF THE INVENTION

To accomplish the foregoing and other objects, features and advantages of the present invention there is provided an expandable grip apparatus to assist in holding a handheld device, the expandable grip includes a base member having a substantially flat contact surface for securing to a surface of the handheld device, a top member that is spaced from the base member, and an expandable center section that connects between the base member and the top member, the expandable center section comprised of a series of integral foldable pleats.

In accordance with other aspects of the present invention, the grip apparatus includes a series of integral foldable pleats include adjacently disposed foldable pleats that define a living hinge between the adjacently disposed foldable pleats to enable the expandable center section to selectively nest onto each other. The base member and the top member can have a round perimeter and have substantially a same size diameter. The base member and the top member can have approximately a same thickness. A thickness of the top member can be greater than a thickness of the bottom member. The expandable center section can have a bottom received within an opening in the base member. The bottom of the expandable center section can be trapezoidal in shape. A bottom surface of the base member can include an adhesive that is configured to secure the grip apparatus to the handheld device. The base member can include a magnet that is configured to secure the grip apparatus to the handheld device.

In accordance with another embodiment of the present invention there is provided a grip apparatus for a handheld device, the grip apparatus including a first member configured to be secured to the handheld device, a second member spaced from the first member, a center section connecting the first member to the second member, the center section having a plurality of central portions, each central portion having a folding upper section and a folding lower section that fold with respect to each other.

In accordance with other aspects of the present invention, the first member and the second member can have substantially a same diameter. The upper section and the lower section for each of the plurality of portions can be tapered and at an angle with respect to each other to thereby form a living hinge therebetween. The grip apparatus can have an expanded configuration and a collapsed configuration and at least one lower section is folded completely under its corresponding upper section when the grip apparatus is in the collapsed configuration.

The base member can include a magnet that is configured to secure the grip apparatus to the handheld device.

In accordance with still another embodiment of the present invention there is provided an expandable grip apparatus for a handheld device, the grip apparatus includes a first member configured to be secured to the handheld device, a second member spaced from the first member, and a center section connecting the first member to the second member, the center section having a substantially consistent diameter at its outermost edge in both an expanded configuration of the grip apparatus and a collapsed configuration of the grip apparatus.

In accordance with other aspects of the present invention, the expandable grip apparatus includes a first member and a second member having substantially the same diameter. In the grip apparatus, a thickness of the first member can be different than a thickness of the second member. The base member can include an adhesive that is configured to secure the grip apparatus to the handheld device. The base member can include a magnet that is configured to secure the grip apparatus to a corresponding magnet on the handheld device.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

There is disclosed a grip apparatus to assist a user in holding an object and facilitate use of the object, such as a phone or other handheld device. The grip apparatus allows the user to hold the handheld device easily with their fingers about a central portion of the phone grip, which can be secured to the handheld device at its base. The grip apparatus has a fully expanded configuration for use when the device is being used or held, and a fully collapsed configuration when the device is stored and not in use, or when it is otherwise desired for the grip apparatus to be non-obtrusive.

Figure 6:
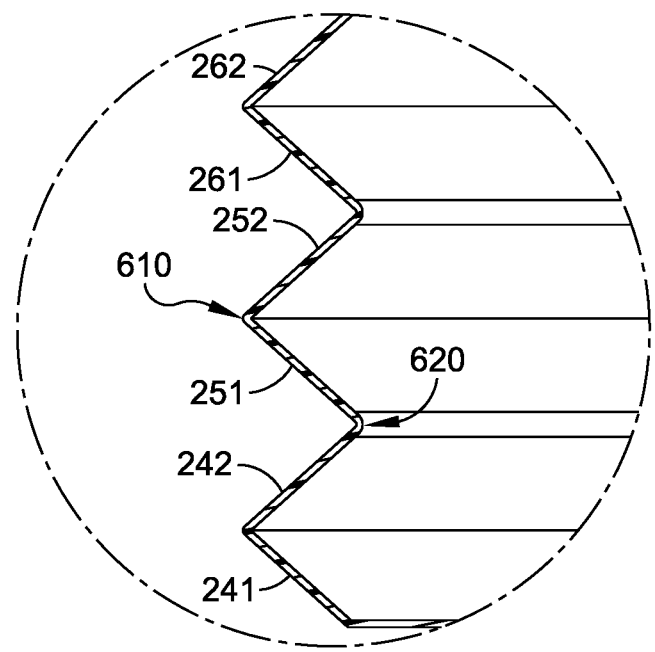
FIG. 6 is an enlarged cross-sectional view of the section as noted in dotted-line in FIG. 5, showing the pleats or foldable sections of the center section in greater detail.
Figure 7:
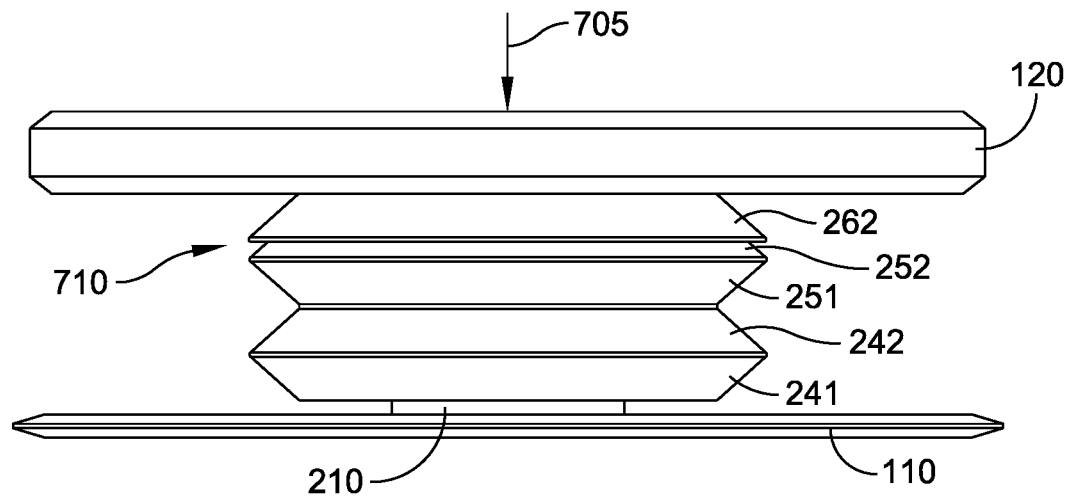
FIG. 7 is a side view of the grip apparatus showing a first foldable pleat in its folded configuration, nested onto another foldable pleat, as pressure is applied to the top of the grip apparatus.
Figure 9:
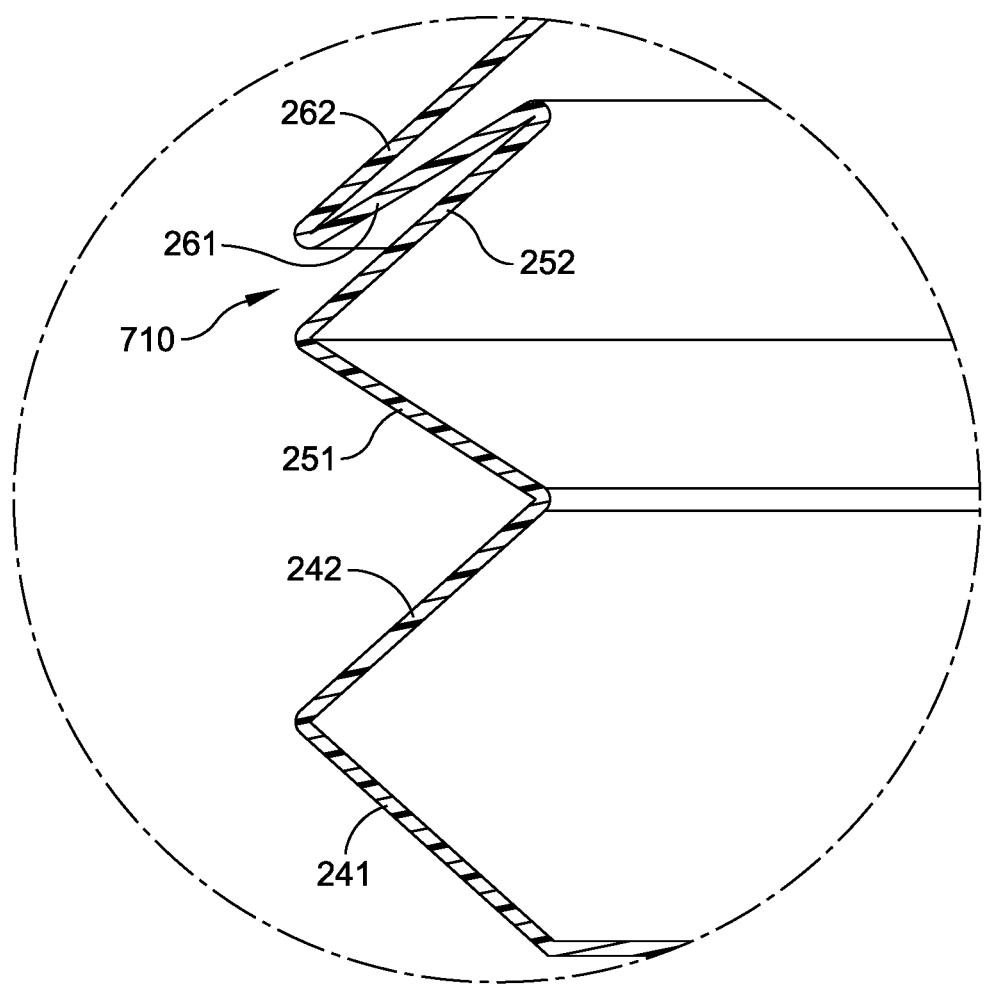
FIG. 9 is an enlarged cross-sectional view of the section as noted in dotted-line in FIG. 8, showing the pleats or foldable sections of the center section in greater detail.
Figure 10:
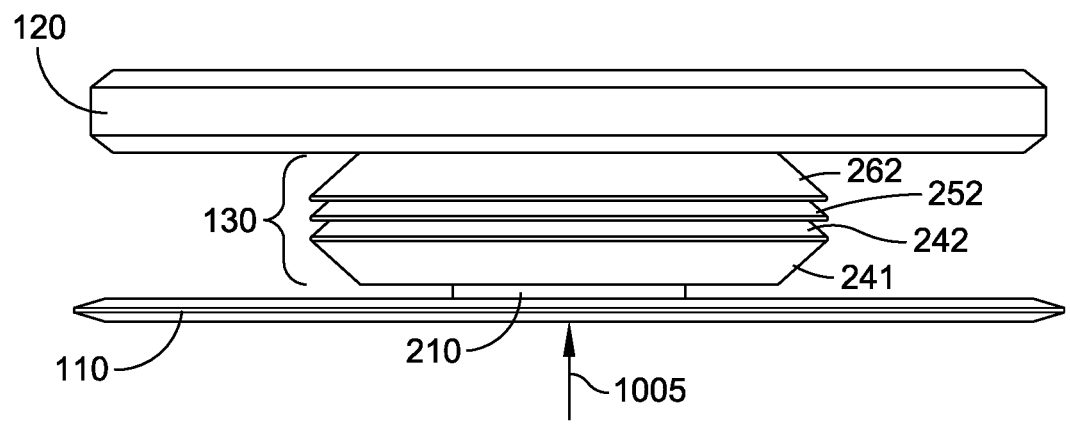
FIG. 10 is a side view of the grip apparatus in a fully collapsed configuration, with the foldable pleats fully nested onto one another.
Figure 15:
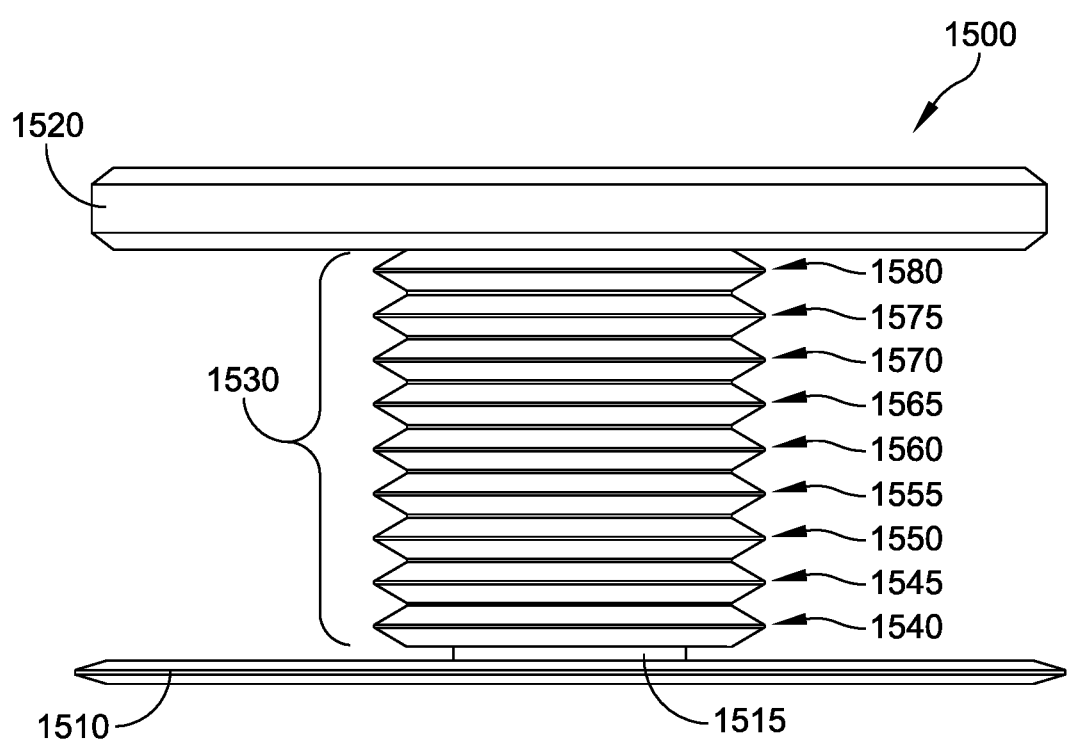
FIG. 15 is a side view of a second embodiment of the present invention of a grip apparatus for a handheld device, showing the grip apparatus in its fully expanded configuration.
Figure 16:
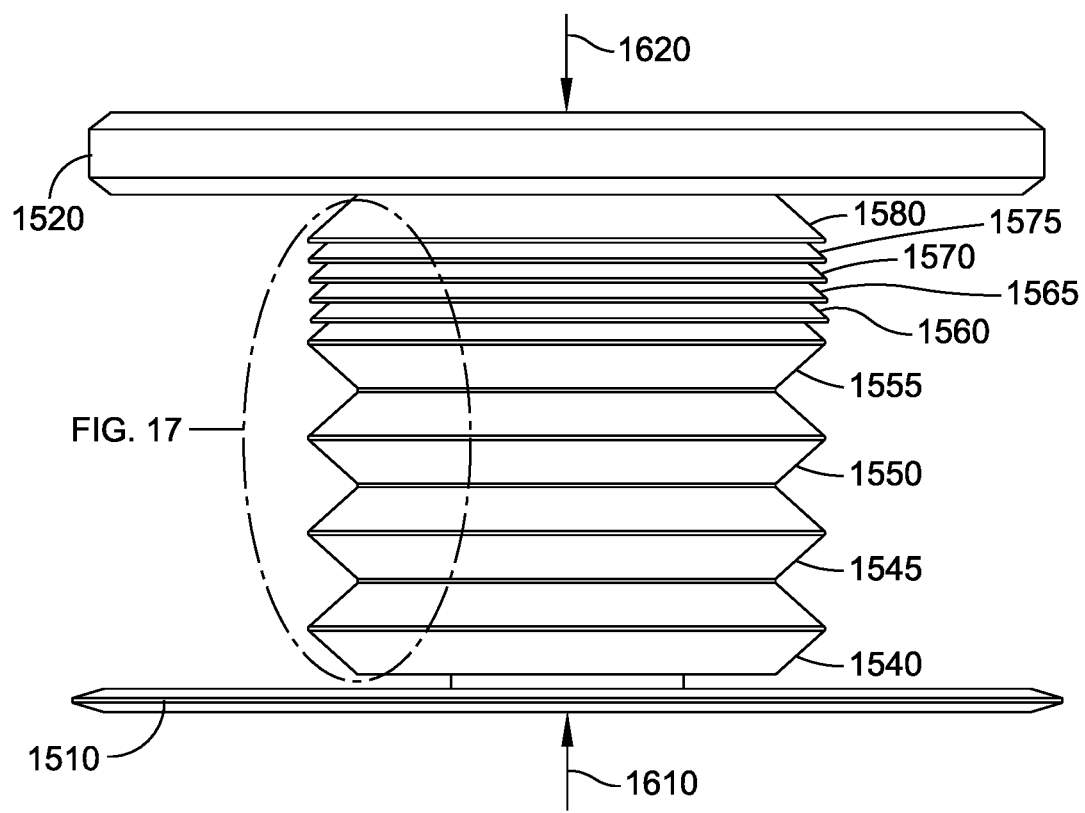
FIG. 16 is a side view of the grip apparatus of FIG. 15, showing the apparatus in a partially-collapsed configuration.
Figure 17:
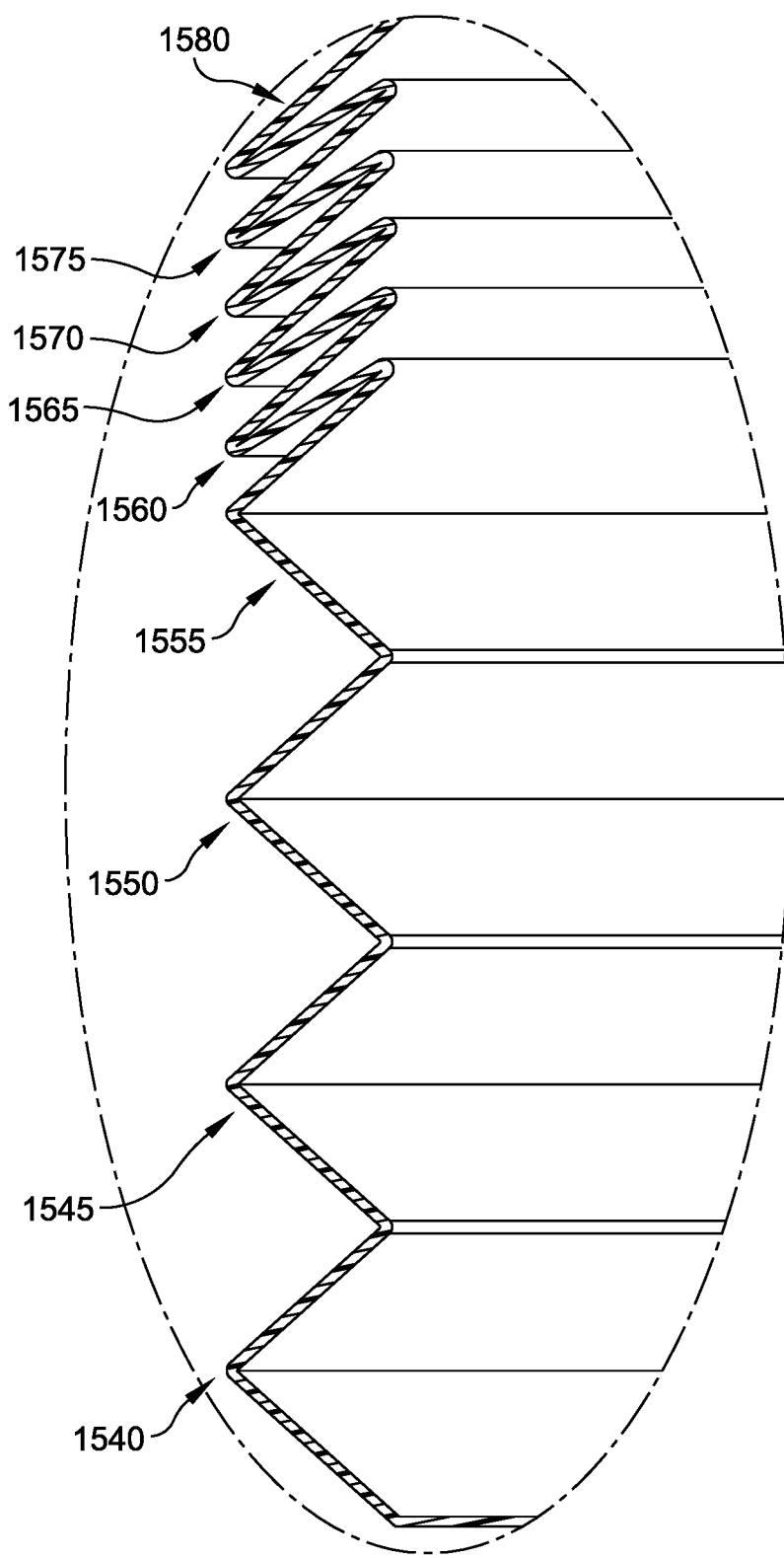
FIG. 17 is an enlarged cross-sectional view of the section as noted in dotted-line in FIG. 16, showing the pleats or foldable sections of the center section in greater detail when in the partially collapsed configuration.

The grip apparatus generally includes a base member and a top member that is spaced from the base member. The grip apparatus also includes an expandable center section that connects between the base member and the top member, comprised of foldable portions having integral foldable pleats. The foldable pleats define a living hinge between the adjacently disposed foldable pleats to enable the expandable center section to selectively next onto each other when in a collapsed configuration. A first example configuration of the grip apparatus, having three portions within the expandable center section is shown in FIGS. 1-14, with FIG. 2 showing the fully expanded configuration, FIG. 7 showing the partially collapsed configuration, and FIG. 10 showing the fully collapsed configuration. A second example configuration of the grip apparatus, having nine portions within the expandable center section is shown in FIGS. 15-17, with FIG. 15 showing the grip apparatus in the fully expanded configuration and FIG. 16 showing the grip apparatus in the partially collapsed configuration.

Figure 1:
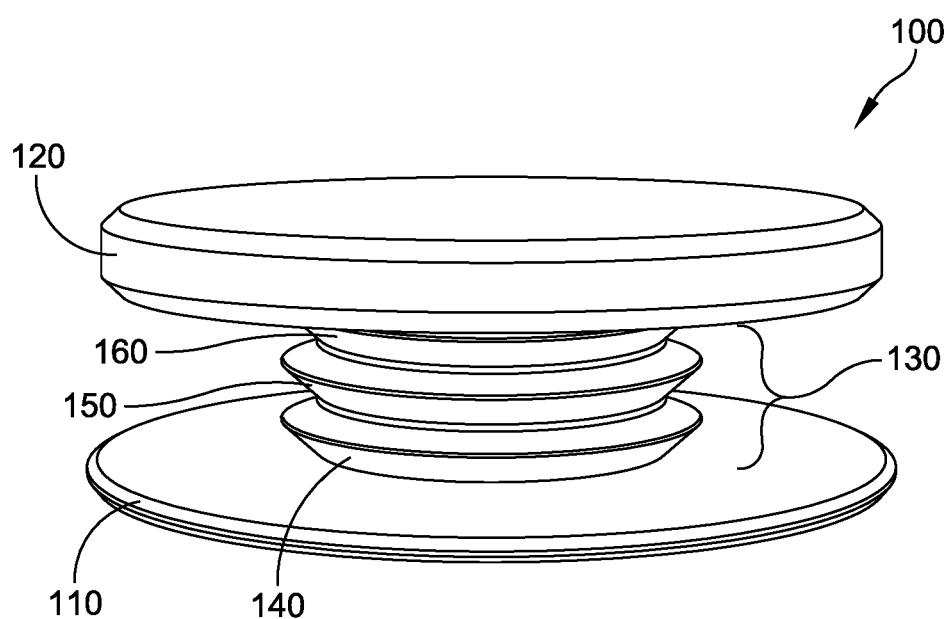
FIG. 1 is an illustration of a first embodiment of the present invention of a grip apparatus for a handheld device, as shown in a side elevation view.
Figure 2:
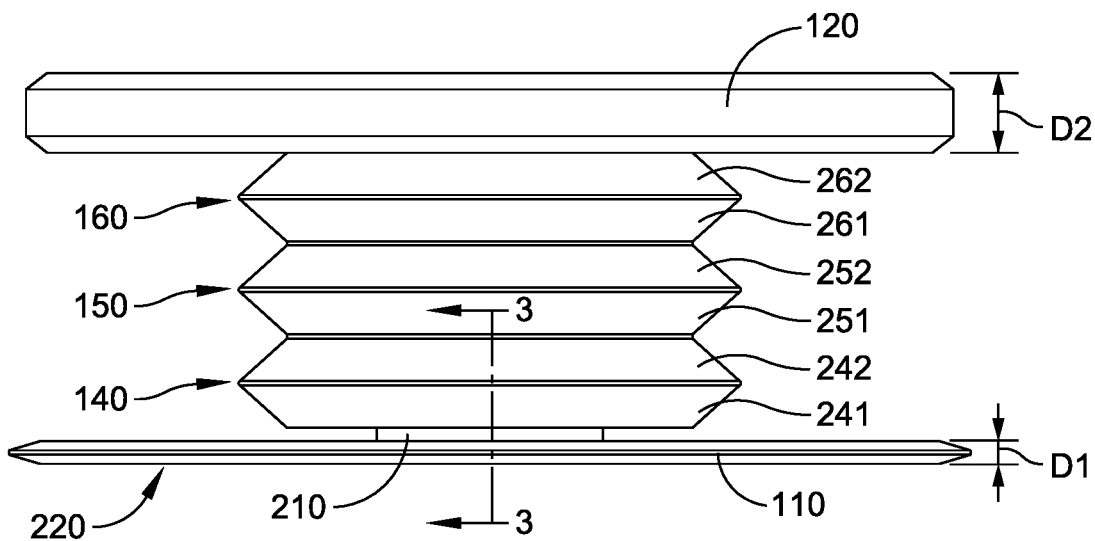
FIG. 2 is a side view of the grip apparatus, shown in the fully expanded configuration.

FIG. 1 is an illustration of a first embodiment of the present invention of a grip apparatus 100 for a handheld device, as shown in a side elevation view. The expandable grip apparatus 100 includes a base member 110, a top member 120, and an expandable center section 130. The base member 110 may be referred to as a first member or a bottom disc herein, and the top member 120 may likewise be referred to as a second member or a second disc herein, as these terms are considered interchangeable.

Figure 13:
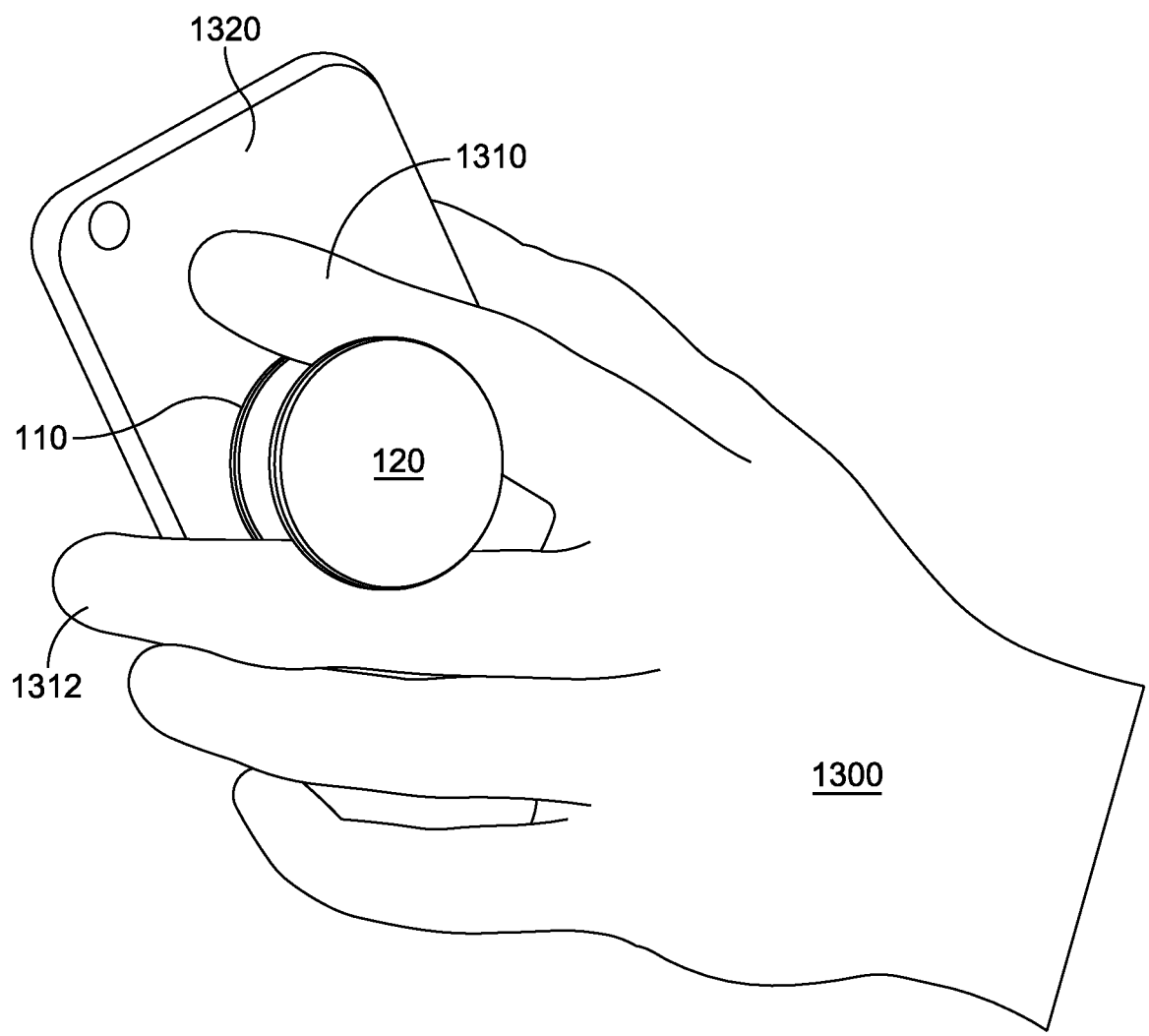
FIG. 13 is a perspective view of the grip apparatus being used to assist a user with holding a handheld device, as shown from the back of the device.
Figure 14:
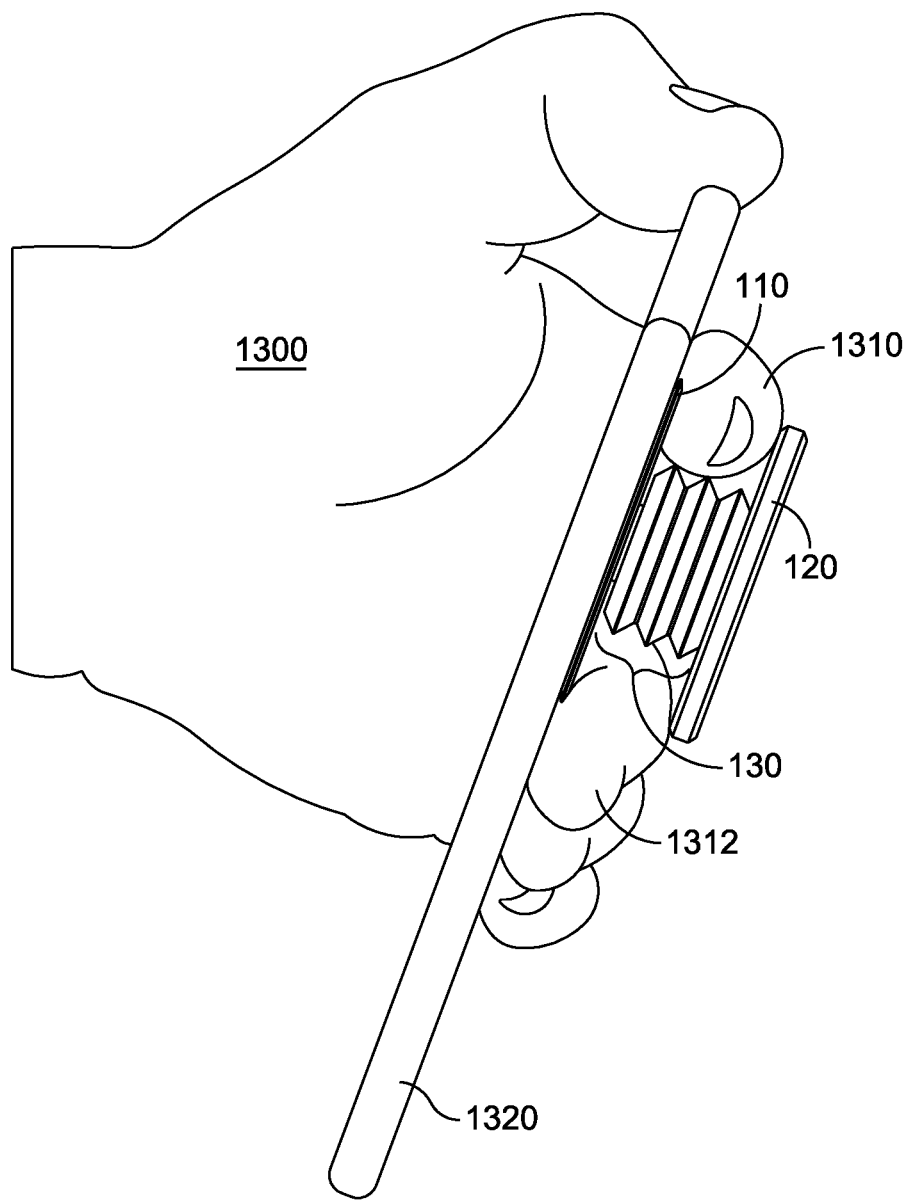
FIG. 14 is another perspective view of the grip apparatus being used to assist the user with holding the handheld device, as shown from the side of the device.

The base member 110 has a substantially flat contact surface for securing to a surface of the handheld device (refer, for example, to FIGS. 13-14 showing the grip apparatus secured to a handheld device). The base member 110 and the top member 120 have a round perimeter as shown, however other shapes may be implemented, such as a hexagonal shape, square shape, or other appropriate shape. The base member and the top member can have the same diameter. The base member 110 and the top member 120 also have a diameter that is substantially the same size for each.

The expandable center section 130 has a series of central portions 140, 150, 160 that define a series of integral foldable pleats. A living hinge is defined between adjacently disposed foldable pleats to enable the expandable center section to selectively nest onto each other, for example as shown in FIG. 10 when in the fully collapsed configuration. This can, for example, be considered an accordion-like folding arrangement for the folding pleats of the center section 130. The expandable center section 130 has a substantially consistent diameter at its outermost edge in both the expanded configuration and the collapsed configuration.

FIG. 2 is a side view of the grip apparatus 100, shown in the fully expanded configuration. The central section 130 has a base shaft 210 that connects the central portions to the base member 110. The bottom of the base shaft 210 is received within an opening in the base member 110. Each portion 140, 150, 160 defines an upper foldable pleat 242, 252, 262 and a lower foldable pleat 241, 251, 261, respectively. The foldable pleats may be referred to as foldable sections herein. The upper foldable pleat and the lower foldable pleat are configured to fold with respect to each other to define the living hinge therebetween. The base member has a thickness D1 and the top member 120 has a thickness D2. The thickness D1 may be the same as the thickness of D2, the thickness D1 may be less than the thickness D2, or the thickness D1 may be greater than the thickness D3, depending upon the particular configuration of the grip apparatus. The thickness D1 may be in the range of 0.01-0.5 inches and the thickness D2 may likewise be in the range of 0.01-0.5 inches, or more. The base member 110 includes a contact surface 220 that is substantially flat for securing to a surface of the handheld device. The contact surface 220 may include an adhesive for securing the grip apparatus to the handheld device, or may include other securing means such as a magnet (see FIG. 3).

Figure 3:
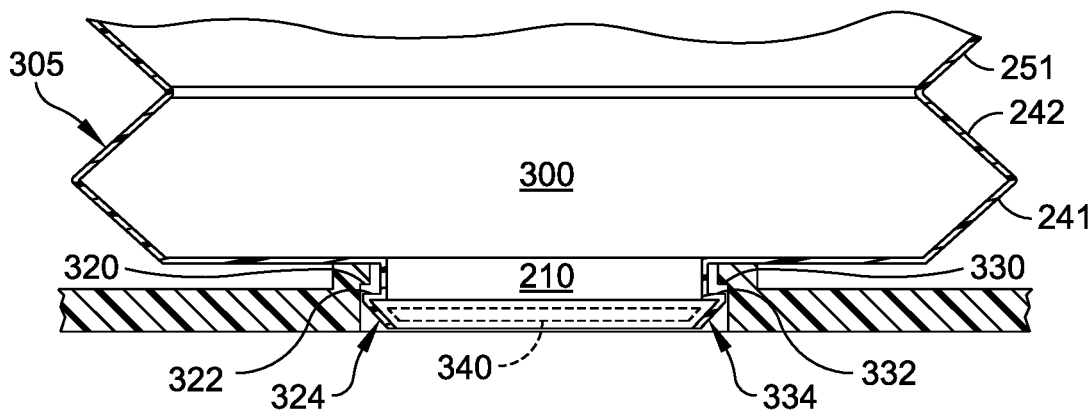
FIG. 3 is a cross-sectional view as taken along line 3-3 of FIG. 2.
Figure 4:
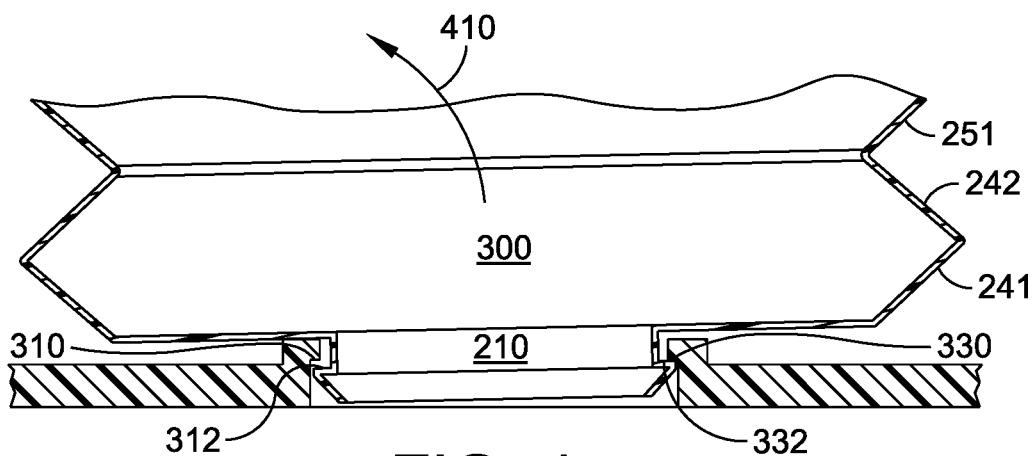
FIG. 4 is a cross-sectional view as taken along line 3-3 of FIG. 2, showing the base of the central member at a slight rotation with respect to the base member.

FIG. 3 is a cross-sectional view as taken along line 3-3 of FIG. 2. The cross-sectional view of the grip apparatus reveals an interior cavity 300 of the central section 130 as well as an outer surface 305. The base shaft 210 has a bottom that is trapezoidal in shape with a first taper 324 and a second taper 334. The bottom of the base shaft 210 can include a magnet 340 for securing the grip apparatus to a device having a corresponding magnet. The base member 110 includes a first ledge 320 that interfaces with the edge 322 and a ledge 330 that interfaces with the edge 332 of the bottom of the base shaft 210. This allows for slight movement and/or rotation of the center section 130 with respect to the base member 110, as shown in FIG. 4 as arrow 410 illustrating this movement. FIG. 4 is a cross-sectional view as taken along line 3-3 of FIG. 2, showing the base of the central member at a slight rotation with respect to the base member. In this rotational movement, the ledge 330 is directly in contact with edge 332, thus preventing any further movement of the grip apparatus 100.

Figure 5:
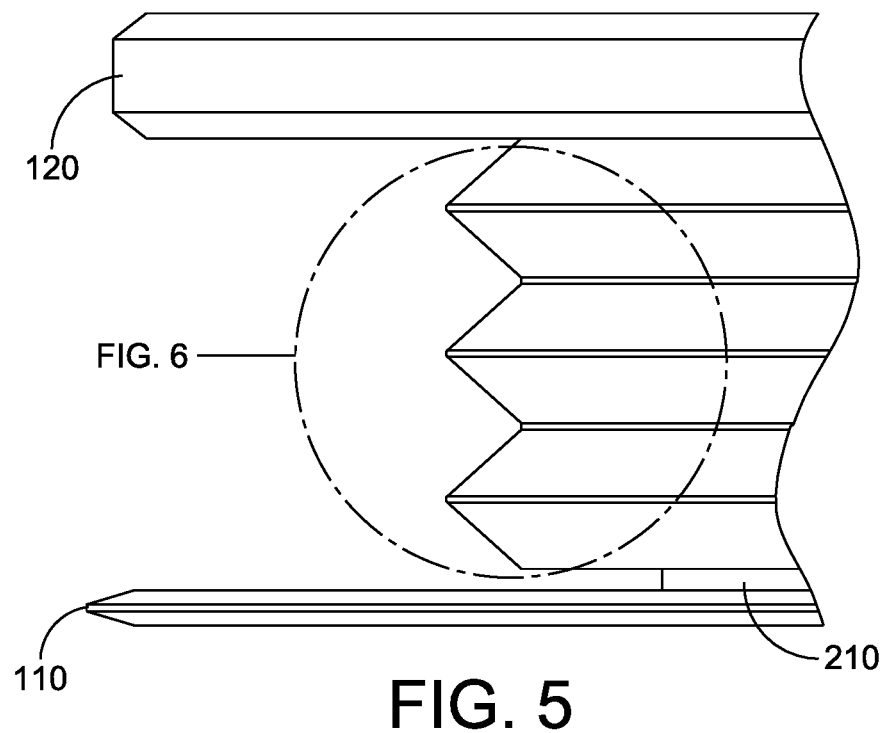
FIG. 5 is an enlarged partial side view of the grip apparatus.

FIG. 5 is a partial side view of the grip apparatus, enlarged to show the foldable pleats in greater detail. The section noted in dotted-line in FIG. 5 is shown in cross-sectional view in FIG. 6, showing the foldable pleats in greater detail. As shown, the first portion 140 includes a lower foldable pleat 241 and an upper foldable pleat 242, the second portion 150 includes a lower foldable pleat 251 and an upper foldable pleat 252, and the third portion 160 includes a lower foldable pleat 261 and an upper foldable pleat 262. The configuration defines a living hinge between adjacently disposed foldable pleats to enable the expandable center section to selectively nest onto each other. For example, there is a living hinge 610 defined between the lower pleat 251 and the upper pleat 252, and a living hinge 620 defined between the upper pleat 242 and the lower pleat 251. Note that the living hinge 620 is inward with respect to the living hinge 610, and that when the center section is described as having a substantially consistent diameter herein, this may be in reference to either the living hinge 610 or the living hinge 620.

Figure 8:
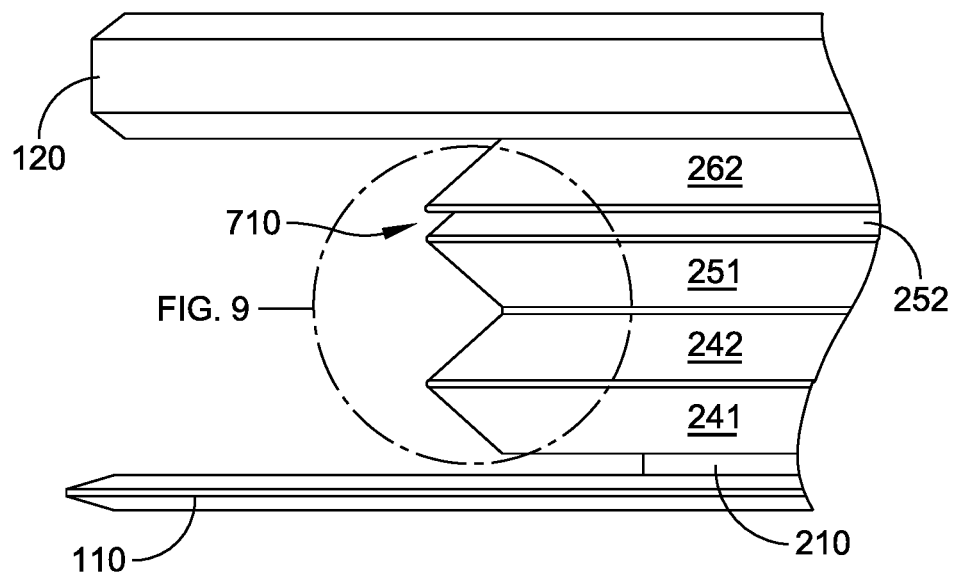
FIG. 8 is an enlarged partial side view of the grip apparatus of FIG. 7.

FIG. 7 is a side view of the grip apparatus showing a first foldable pleat in its folded configuration, nested onto another foldable pleat, as pressure (arrow 705) is applied to the top member 120 of the grip apparatus 100, with the grip apparatus 100 shown in a partially-collapsed configuration. The first portion 160 including the upper pleat 262 and the lower pleat 261 has been nested onto the adjacent pleat 252, showing the grip apparatus in a partially-collapsed configuration. In this partially-collapsed configuration, a first folded flap 710 is formed. FIG. 8 is a partial side view of the grip apparatus of FIG. 7, enlarged to show the foldable pleats in greater detail. FIG. 9 is a cross-sectional view of the section as noted in dotted-line in FIG. 8, enlarged to show the pleats or foldable sections of the center section in greater detail. In this configuration, note that the pleat 261 is not visible from the exterior as it is fully nested onto the upper pleat 252.

Figure 11:
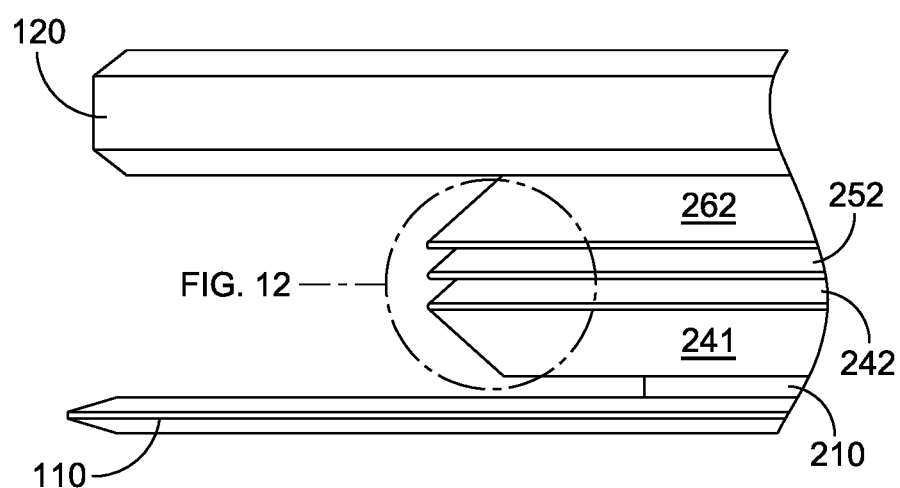
FIG. 11 is an enlarged partial side view of the grip apparatus of FIG. 10.

FIG. 10 is a side view of the grip apparatus in a fully collapsed configuration, with the foldable pleats fully nested onto one another. The pleats of the center section 130 are fully nested, for example, by pressure applied on the bottom member 110 in the direction of arrow 1005. FIG. 11 is an enlarged partial side view of the grip apparatus of FIG. 10. In the fully collapsed configuration, the lower pleats 261 and 251 are fully nested, with lower pleat 261 fully nested onto upper pleat 252, and lower pleat 251 fully nested onto upper pleat 242, as shown in grater detail in FIG. 12.

Figure 12:
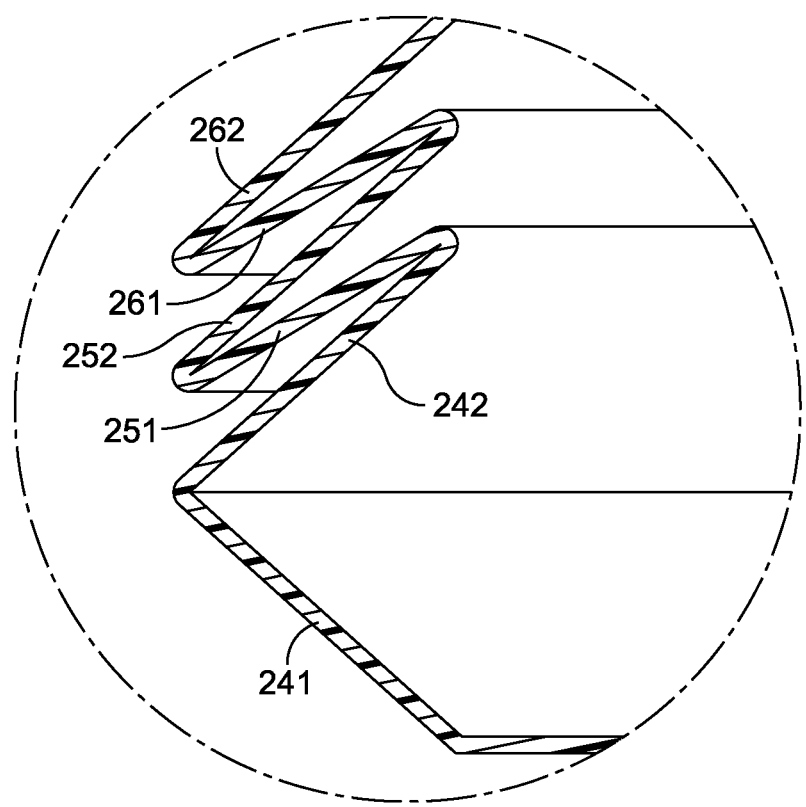
FIG. 12 is an enlarged cross-sectional view of the section as noted in dotted-line in FIG. 11, showing the pleats or foldable sections of the center section in greater detail when in the fully collapsed configuration.

FIG. 12 is an enlarged cross-sectional view of the section as noted in dotted-line in FIG. 11, showing the pleats or foldable sections of the center section in greater detail when in the fully collapsed configuration. Note that the lower pleats 261 and 251 are not visible from the exterior surface of the center section, and that the upper pleats 252 and 242 are only partially visible, as they are fully nested onto one another.

It will be appreciated that the grip apparatus 100 of the present disclosure affords a multitude of positions, including the fully expanded configuration, the fully collapsed configuration, and a plurality of partially-collapsed configurations in between the fully expanded and fully collapsed configurations. This allows a user to move the base and top member to the desired spacing with respect to each other, rather than only having an open position and a closed position. By clicking or locking the individual pleats onto each other, this allows the grip apparatus 100 to have a multitude of spaced apart positions.

FIG. 13 is a perspective view of the grip apparatus 100 being used to assist a user with holding a handheld device 1320, as shown from the back of the device 1320. The hand 1300 of the user includes fingers 1310, 1312 that are shown holding the device 1320 with the assistance of the grip apparatus 100.

FIG. 14 is another perspective view of the grip apparatus 100 being used to assist the user with holding the handheld device 1320, as shown from the side of the device 1320. Note that when holding the device, the fingers 1310, 1312 can be comfortably placed about the central portion 130, in between the base member 110 and the top member 120.

FIG. 15 is a side view of a second embodiment of the present invention of a grip apparatus for a handheld device, showing the grip apparatus 1500 in its fully expanded configuration. The expandable grip apparatus 1500 includes a base member 1510, a top member 1520, and an expandable center section 1530. The central section 1530 has a base shaft 1515 that connects the center section 1530 to the base member 1510.

The expandable center section 1530 has a series of central portions 1540, 1545, 1550, 1555, 1560, 1565, 1570, 1575, 1580 that define a series of integral foldable pleats. The integral foldable pleats define a living hinge between adjacently disposed foldable pleats to enable the expandable center section to selectively nest onto each other when in the fully collapsed configuration.

Each portion 1540, 1545, 1550, 1555, 1560, 1565, 1570, 1575, 1580 defines an upper foldable pleat and a lower foldable pleat. The foldable pleats may be referred to as foldable sections herein. The upper foldable pleat and the lower foldable pleat are configured to fold with respect to each other to define the living hinge therebetween. The base shaft 1515 can include a trapezoidal shaped bottom, for example, like the trapezoidal shape of member 210 as shown in FIGS. 3-4. The base shaft 1515 engages with the base member 1510 in a similar manner.

It will be appreciated that one major advantage of this structure, as shown by FIG. 15, is that by providing a center section with a substantially consistent diameter, the grip apparatus can be provided for any length and any number of pleats, without sacrificing the rigidity of the apparatus. A telescoping or tapered center section would have a limit on the length due to the tapering of the diameter. However, a substantially consistent diameter allows a substantially longer center section without sacrificing rigidity of the apparatus. The apparatus can thus be used, for example, for assisting with gripping larger objects, while maintaining rigidity of the apparatus.

FIG. 16 is a side view of the grip apparatus of FIG. 15, showing the apparatus in a partially-collapsed configuration. Note that a pressure applied via arrow 1620 to the top member 1520, causing portions 1580, 1575, 1570, 1565, and 1560 to nest onto the center section 1530. FIG. 17 is an enlarged cross-sectional view of the section as noted in dotted-line in FIG. 16, showing the pleats or foldable sections of the center section in greater detail when in the partially collapsed configuration. It will be appreciated that although the fully collapsed configuration of this embodiment is not expressly shown, its configuration should be readily apparent in view of the present description.

Having now described a limited number of embodiments of the present invention, it should now be apparent to those skilled in the art that numerous other embodiments and modifications thereof are contemplated as falling within the scope of the present invention, as defined by the appended claims. For example, although shown and described with respect to a phone or handheld electronic device, the grip apparatus could apply to any object, even non-electronic, such as books, eReaders, notebooks, or any other object placed in one's hand, including but not limited to baby bottles, plates, cups, glasses, bowls, silverware, and many more uses. Also, although adhesive and a magnet are specifically disclosed as example means for securing the grip apparatus to an object, any appropriate temporary or permanent fastener may be used, such as a hook and loop fastener, to secure the grip apparatus to an object. Addition- ally, although shown specifically with three central shaft sections (in FIGS. 1-14) and nine central shaft sections (in FIGS. 15-17), it will be appreciated that any number of central sections or foldable pleats can be implemented, depending on the desired design and functionality.

What is claimed is:

1. An expandable grip apparatus to assist in holding a handheld device, the expandable grip comprising:
    a base member having a substantially flat contact surface for securing to a surface of the handheld device;
    a top member that is spaced from the base member; and
    an expandable center section that connects between the base member and the top member, the expandable center section comprised of a series of integral foldable pleats;
    wherein the expandable center section has an expanded configuration and a collapsed configuration, and wherein the series of integral foldable pleats include adjacently disposed foldable pleats that define a living hinge between the adjacently disposed foldable pleats to enable the expandable center section to selectively nest onto each other in at least a partially collapsed configuration;
    wherein the expandable center section also has a depending base shaft that connects the center section to the base member;
    wherein the base member has a centrally disposed through opening for receiving the base shaft so as to interlock the base shaft with the base member;
    wherein the base member has an upper planar surface and further includes an upwardly extending post that extends above the upper planar surface of the base member and that is disposed at and forms a part of the through opening;
    wherein said upwardly extending post defines a gap that is formed between the upper planar surface of the base member and a lower planar pleat surface, said gap enabling limited rotation of the expandable center section with respect to the base member.

2. The expandable grip apparatus of claim 1, wherein the base shaft interlocks by means of a ledge and edge construction between the base shaft and the through opening in the base member.

3. The expandable grip apparatus of claim 2 wherein the ledge and edge construction comprise the base member including at least one ledge that engages with an edge of the base shaft.

4. The expandable grip apparatus of claim 3, wherein the edge of the base shaft is disposed within the through opening of the base member, wherein the edge of the base member in part defines the through opening, and wherein a bottom of the base shaft is tapered to define the edge of the base shaft enabling an engagement with the ledge of the base member.

5. The expandable grip apparatus of claim 4 wherein a bottom surface of the base member includes an adhesive that is configured to secure the grip apparatus to the handheld device.

6. The expandable grip apparatus of claim 1 wherein the base member and the top member have a round perimeter and have substantially a same size diameter.

7. The expandable grip apparatus of claim 1 wherein the base member and the top member have approximately a same thickness.

8. The expandable grip apparatus of claim 1 wherein a thickness of the top member is greater than a thickness of the bottom member.

9. The expandable grip apparatus of claim 1, wherein the base member includes a magnet that is configured to secure the grip apparatus to the handheld device.

10. The expandable grip apparatus of claim 9 wherein the magnet is disposed at the through opening of the base member.

11. The expandable grip apparatus of claim 1 wherein, in the expanded configuration the pleats are touched at an angle with respect to each other.

12. The expandable grip apparatus of claim 11 wherein at least one pleat is folded completely against an adjacent pleat in order to close the space between the base member and top member.

13. A method of controlling an expandable grip apparatus to assist in holding a handheld device, said method comprising:
    providing a base member having a substantially flat contact surface for securing to a surface of the handheld device;
    providing a top member and an expandable center section that connects between the base member and the top member;
    forming the expandable center section of a series of integral foldable pleats;
    wherein the expandable center section has an expanded configuration and a collapsed configuration, and wherein the series of integral foldable pleats include adjacently disposed foldable pleats that define a living hinge between the adjacently disposed foldable pleats;
    and wherein, in an at least partially collapsed configuration, one or more of the foldable pleats are nested onto each other;
    including providing the expandable center section with a depending base shaft that connects the center section to the base member;
    providing that the base member has a centrally disposed through opening for receiving the base shaft so as to interlock the base shaft with the base member;
    providing that the base shaft interlocks by means of a ledge and edge construction between the base shaft and the through opening in the base member;
    providing an upwardly extending post that extends above an upper planar surface of the base member so as to define a gap between the upper planar surface of the base member and a lowermost pleat surface of the center section, said gap enabling limited rotation of the expandable center section with respect to the base member.

14. The method of claim 13 wherein the gap that is formed between the upper planar surface of the base member and the lower planar pleat surface has the same width therealong.

15. The method of claim 14 wherein a bottom of the base shaft is tapered to define an edge of the base shaft enabling an engagement with a ledge of the base member.

16. The method of claim 14 wherein the lower planar pleat surface is in contact with a top of the upwardly extending post.

17. The method of claim 13 wherein the base member also includes a magnet that is configured to secure the grip apparatus to the handheld device.

18. The method of claim 17 wherein the magnet is disposed at the through opening of the base member.

* * * * *